United States Patent [19]

Trautwein

[11] 4,240,459
[45] Dec. 23, 1980

[54] VALVE ASSEMBLY

[76] Inventor: Hansjörg Trautwein, Am Stadtgarten 1, 4650 Gelsenkirchen, Fed. Rep. of Germany

[21] Appl. No.: 942,065

[22] Filed: Sep. 13, 1978

[30] Foreign Application Priority Data

Sep. 14, 1977 [DE]  Fed. Rep. of Germany ....... 2741280

[51] Int. Cl.³ ............................................. F16K 43/00
[52] U.S. Cl. ....................................... 137/318; 251/86
[58] Field of Search ................ 137/315, 318; 285/197, 285/198, 199; 251/84, 86, 88

[56] References Cited

U.S. PATENT DOCUMENTS

| | | | |
|---|---|---|---|
| 1,854,370 | 4/1932 | Droege | 251/86 |
| 2,763,282 | 9/1956 | Reedy et al. | 137/318 |
| 2,899,983 | 8/1959 | Parris | 138/97 |
| 2,983,477 | 5/1961 | Merrill | 137/318 |
| 3,045,512 | 7/1962 | Risley et al. | 137/318 |
| 3,131,712 | 5/1964 | Risley et al. | 137/318 |
| 3,222,027 | 12/1965 | Gilleeny | 251/88 |
| 4,114,851 | 9/1978 | Shivak et al. | 251/88 |

FOREIGN PATENT DOCUMENTS

| | | | |
|---|---|---|---|
| 158128 | 9/1939 | Fed. Rep. of Germany | 137/318 |
| 1047548 | 12/1958 | Fed. Rep. of Germany | 137/318 |
| 1882787 | 10/1963 | Fed. Rep. of Germany . | |
| 19628 | of 1909 | United Kingdom . | |

Primary Examiner—Martin P. Schwadron
Assistant Examiner—G. L. Walton
Attorney, Agent, or Firm—Karl F. Ross

[57] ABSTRACT

A valve assembly adapted to be emplaced upon a pipe comprises a housing having a bore extending perpendicular to the pipe to which the valve is to be connected and serving as a guide passage for a drill adapted to penetrate the pipe wall. The housing is formed with a transverse slot through which a slider can be inserted to block escape of fluid from the passage upon withdrawal of the drill. The control member is then mounted in this passage and can be used to open and close the valve which communicates with the pipe to which the valve connects via the aforementioned slot.

8 Claims, 9 Drawing Figures

VALVE ASSEMBLY

FIELD OF THE INVENTION

My present invention relates to a valve assembly and, more particularly, to a system of the type which is adapted to be applied to a pipe along a nonperforated wall portion thereof to form a valve connecting this pipe to some other fitting such as another pipe.

BACKGROUND OF THE INVENTION

Frequently it is desirable to provide a valve or other connection between one pipe and another pipe at a location at which the first pipe has no port or other opening at which the connection can be made.

The pipe is then drilled and a fitting, such as a valve housing or simply a connecting fitting, may be applied to the drill pipe and sealingly clamped around the hole to make the connection.

The aforementioned technique is difficult to carry out when the first pipe is under pressure and complicated devices are required for guiding the drill.

Thus it has been proposed to provide a valve housing which surmounts the pipe at the location to be provided with a valve, this housing being formed with a guide passage through which a drill can be advanced to penetrate the wall of the pipe and connect this passage to the fluid stream. The housing is also formed with a fitting for connection to another pipe and communicating with this passage, a valve member being provided between the main passage of the housing and the further passage for the control of fluid flow between the two pipes.

Reference can be had to a British Pat. No. 19,628 which discloses a valve of this type in which the valve member is a ball fixed to a control rod sealingly guided in a bushing which, in turn, is received threadedly in a sleeve. The sleeve is connected by a screw thread to the fitting or outlet-forming portion of the housing.

Upon attachment of the housing to the pipe which is to be formed with the valve or connection, the main passage is used to allow the drill to engage the wall of the pipe and bore a hole therein.

Upon formation of this hole, the drill is withdrawn and the positioning rod is actuated so that the ball enters the axial passage, i.e. the passage previously occupied by the drill and which generally extends radially of the pipe.

The ball is thus urged by the pressure of the fluid against an upper portion of the axial main passage of the housing to seal the latter against the exterior.

The drill and the guide are then replaced by a valve unit which is attached to the housing and the valve unit can include a stem which urges the ball away from the seat and thus permits pressure equalization on opposite sides of the ball. The valve can then be closed by the stem. The auxiliary blocking elements can then be removed and the auxiliary passage through which it was inserted can serve to receive the pipe to which the valve is also to be connected, i.e. the second pipe can be connected to the fitting at the latter passage.

An assembly of this type frequently has the disadvantage that the ball either does not seat fully or its displacement into full sealing relationship causes the loss of sealing action around the actuating rod. This is because the packing bushing around this rod is stressed not only axially but also radially by the pressure of the fluid against the ball.

Still another disadvantage of this earlier system is that the use of a ball requires the housing to have large dimensions corresponding to the diameter of the ball or to its thickness dimension measured radially with respect to the pipe or axially along the main or boring passage. This frequently is inconvenient and prevents use of the assembly where space is at a premium. This is especially the case when the main passage practically corresponds to the diameter of the bore to be drilled in the passage.

Reference may also be had to the system described in German Pat. DT-PS No. 855,344 which provides a housing into which a latter sleeve can be treated for sealing engagement with a spindle. This spindle can have a wedge-shaped sealing plate on its end penetrating into the housing. The sealing plate is used as a slide along carefully machined or constructed guide surfaces to block the housing passage. Naturally, the precision with which such a device must be constructed renders the assembly expensive and disadvantageous for many applications.

OBJECTS OF THE INVENTION

It is the principal object of the present invention to provide a valve assembly for the aforedescribed purposes which avoids the drawbacks of the earlier systems described above and facilitates the mounting and functioning of a valve while reducing the dimensions of the assembly and especially its housing and the operating elements of the valve.

It is another object of the invention to provide an improved assembly for in situ mounting of a valve and the boring of an orifice communicating therewith in a pipe, which is free from the disadvantages of the earlier systems noted above and which has relatively small size and low cost.

SUMMARY OF THE INVENTION

These objects and others which will become apparent hereinafter are attained, in accordance with the present invention by the use of an auxiliary blocking element which is in the form of a plate guided through an elongated slot in the housing or fitting which ultimately forms the auxiliary passage and extends transversely to the main or drilling passage of the housing, this slot being located diametrically opposite a recess in this housing into which the closure plate extends when it is to perform its blocking function.

According to the invention, therefore, the housing is constituted as a saddle adapted to be mounted upon a pipe to be provided with the valve, e.g. via an annular seal engageable with the outer surface of the pipe, and is connected to the latter by strap means, e.g. a pair of U-bolts which straddle the pipe and are affixed to the housing by respective nuts.

According to an important feature of the invention, this housing is formed with an axial main bore, generally extending radially of the pipe, which is open toward the outer wall of the latter within the sealing ring and through which a drill can be passed to bore the requisite hole or orifice in the pipe wall. The free end of this passage is advantageously provided with a screw thread to which the drill guide bushing may be affixed.

According to an essential feature of the invention, the housing is formed with an auxiliary passage in the form of a slot which preferably lies in a plane perpendicular to the axis of the main bore and parallel to the axis of the pipe, this slot having limited height as measured along the axis of the main bore and corresponding closely to the maximum thickness of the auxiliary closure plate which is passed radially therethrough and is adapted to block the main bore when the drill is withdrawn and this plate is displaced across the main bore into the aforementioned recess.

According to the invention, the aforementioned fitting is provided with a thread surrounding the slot and into or onto which a sleeve is threaded, the actuating rod for the plate passing through this sleeve and sealingly engaging same. It is another essential of the present invention that the connection between the plate and this rod be of a so-called type, i.e. a connection allowing relative displacement of the plate and the rod in an articulated or pivotal manner, e.g. by virtue of a universal joint, hinge or like construction or, in its most general terms, by reason of a relative play in the axial direction of the main bore transverse to the plane of the slot. Thus the plate may be urged by fluid pressure against a sealing portion of the outermost or upper part of the housing without placing any strain upon the actuating rod.

The second passage through which the plate is inserted and which is formed as a slot thus constitutes a constriction with respect to the cross section of the outlet fitting. The upper and lower surfaces of the slot, however, are flush with the corresponding surfaces of the aforementioned recess in the inner wall of the housing at least in the regions in which these surfaces lie directly opposite one and other, for effective sealing. The term "flush" as used herein is intended to mean coplanarity. The slit-like configuration of the opening through which the plate is passed reduces the requisite height of the housing and enables the latter to be much smaller than prior art systems in which the auxiliary closure member is a ball, wedge or like structure. As a result, the material requirements are reduced and the valve assembly is formed less expensively. Furthermore, it enables the overall height of the valve unit, i.e. the valve members which take over the opening and closing function from the auxiliary closure system, to be reduced and it should be noted that the members of this valve unit are usually relatively expensive because they are composed entirely of brass. The slit-like opening enables the stroke of the valve unit to be limited and hence the size thereof is minimal.

A further advantage resides in the fact that an upright spindle can be used for the valve unit and thus this can be formed in a particularly simple and inexpensive manner.

The valve plate of the auxiliary closure assembly is provided, in accordance with a feature of the invention with a seating formation which precludes lateral displacement of the plate away from its seat against the housing upon the development of elevated pressures and ensures a satisfactory seating of this plate around the opening to be closed off in the housing.

The constriction of slot-like passage through which the valve plate is passed can, in accordance with the best mode embodiment of the invention, be located at a central region of the connecting fitting, i.e. at the center of the zone surrounded by the thread for connecting the other pipe to the valve housing. The upper face of the slot and of the recess form the seat for the plate while the lower face of the slot and the recess form a seat for the valve of the unit when the plate is withdrawn or for this plate prior to its withdrawal. The distance between these two seats is, of course, approximately equal to the width of the slot measured along the axis of the main passage of the housing and hence in the direction of displacement of the valve member of the valve unit which is attached to the housing once the drill is removed. The stroke of this valve member is thus held to a minimum even if it must be equal to this width. The stroke is significantly less than that of conventional systems in which the valve member must traverse the entire diameter of the connecting fitting and the region surrounded by the thread of the latter.

According to a further feature of the invention, the formation on the plate is an angular projection which is provided on the upper surface of the plate, this projection or ridge serving to center the plate against its upper seat under the pressure of the fluid therebelow and precluding lateral dislocation of the plate. Naturally, it is also possible to achieve this result by using, instead of an annular projection, the beveling of the edges of the plate to correspond to complementary bevels of the upper seat.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
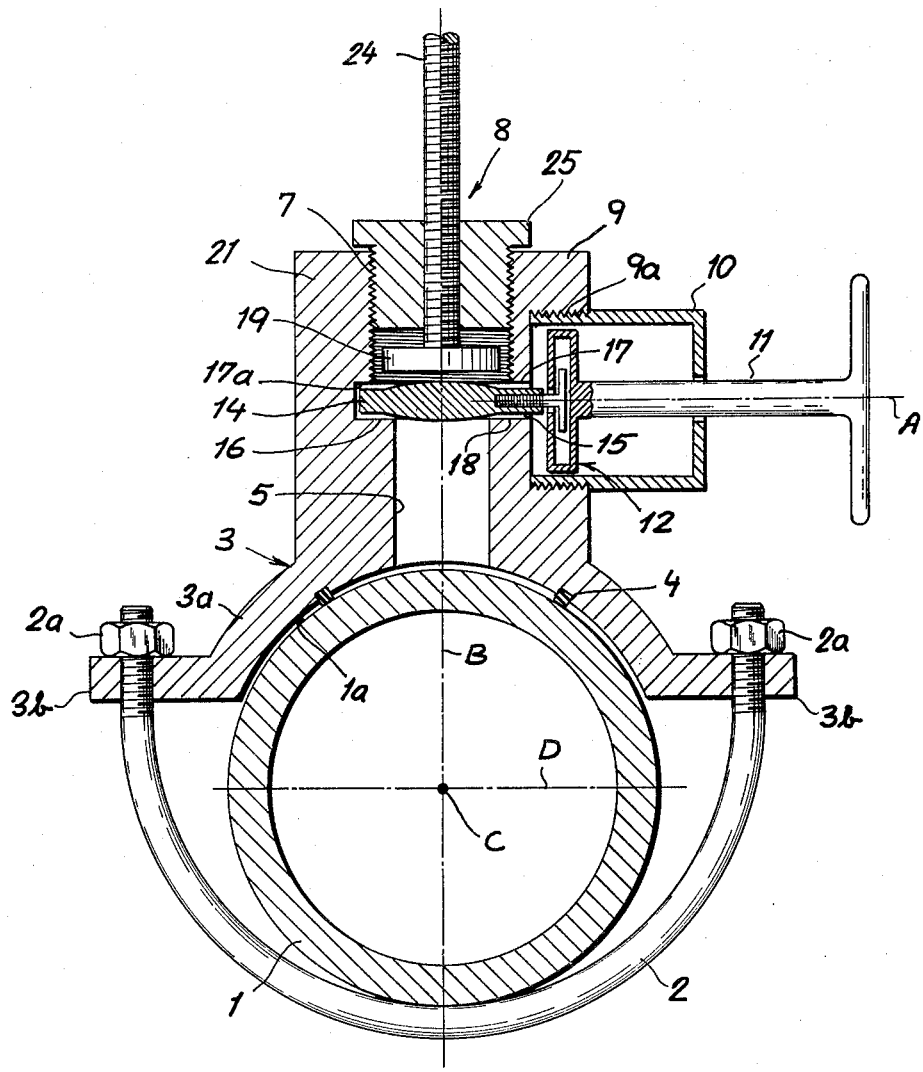
FIG. 1 is a somewhat diagrammatic axial cross-sectional view through an assembly embodying principles of the present invention.
Figure 2:
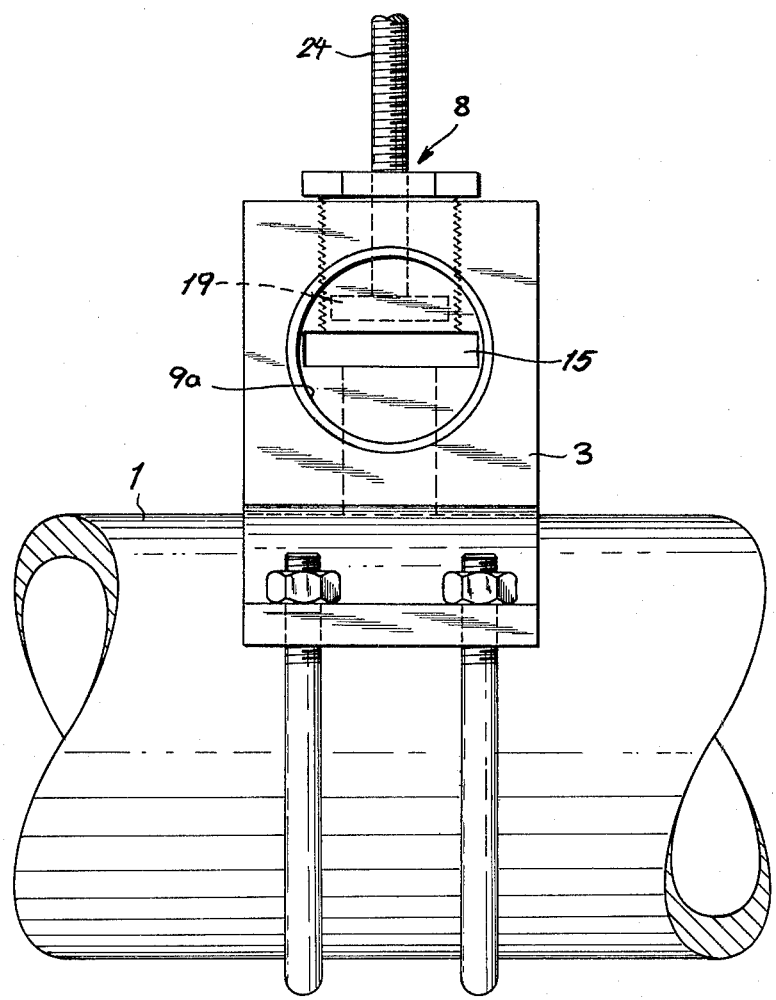
FIG. 2 is a side-elevational view of this assembly with the auxiliary closure member and its actuator removed.
Figure 8:
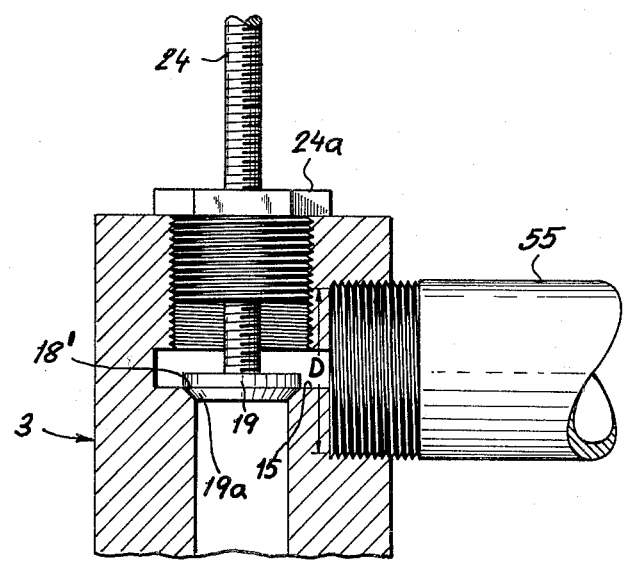
FIG. 8 is a fragmentary cross-sectional view of a portion of the valve showing the connection of another pipe thereto.
Figure 4:
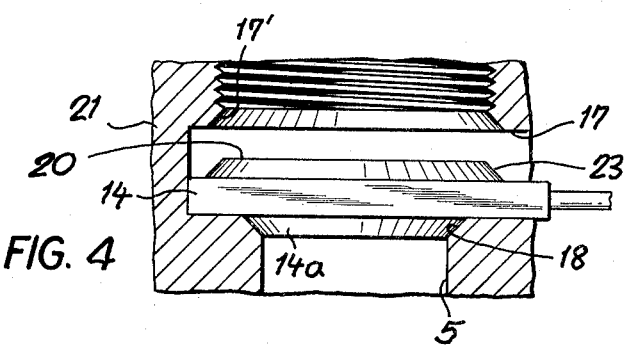
FIG. 4 is a detail side view of the plate, showing portions of the housing in sections.
Figure 5:
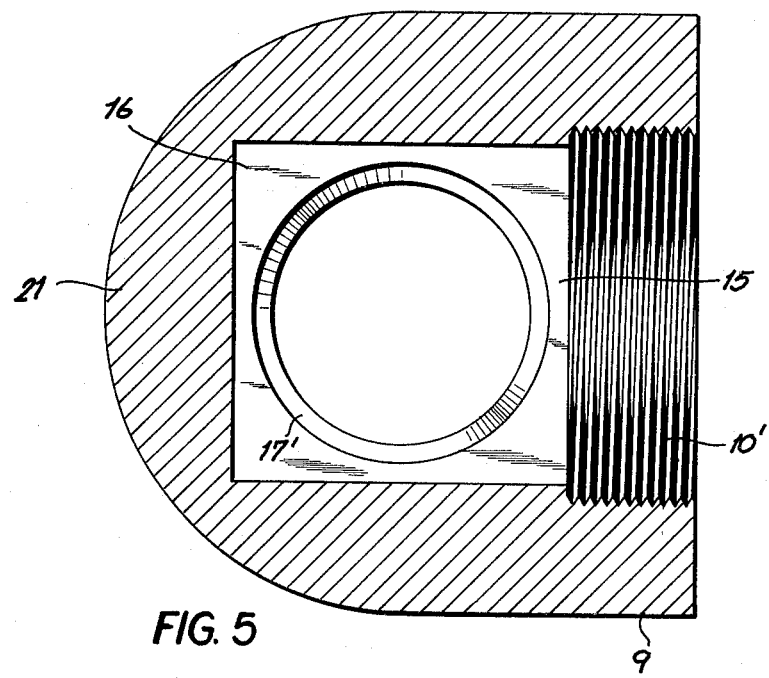
FIG. 5 is a transverse cross-sectional view through the slot region of the housing.
Figures 6, 7:
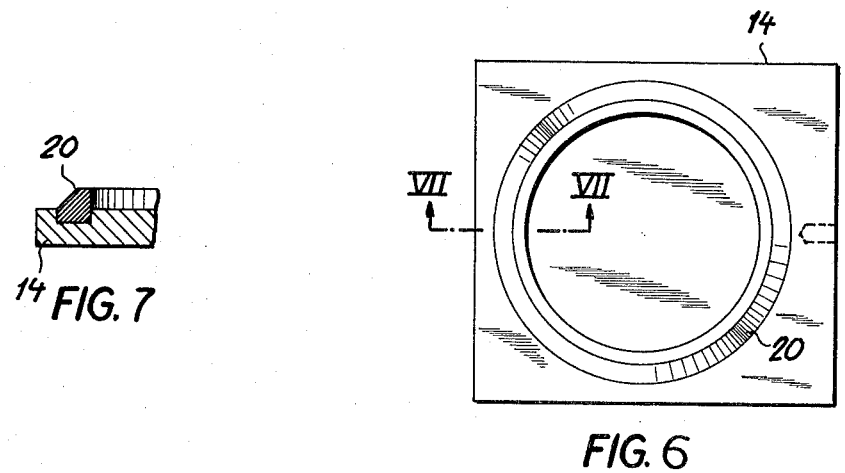
FIG. 6 is a plan view of the plate.
FIG. 7 is a cross section through the plate along the line VII—VII of FIG. 6.

In FIGS. 1 and 2, I have shown a valve assembly for a pipe 1 which is to be connected to, for example, a pipe 55 as shown in FIG. 8 with a valve connection between the two pipes. As is apparent from FIG. 1, the valve assembly is provided in an unapertured region of the pipe 1.

The valve assembly comprises a housing 3 which has a sad-die-shaped portion 3a adapted to rest upon an outer surface 1a of the pipe 1 via an O-ring seal shown at 4. The saddle-shaped portion 3a has a pair of outwardly extending lugs 3b which are traversed by the threaded ends of a pair of U-bolts 2 which extend beneath the pipe 1 and clamp the housing 3 onto the pipe when their respective nuts 2a are tightened. The U-bolts 2 thus function as straps for securing the housing to the pipe.

The housing 3 also is formed with an upright column generally represented at 21 which is formed with a lateral bore 9a provided with an internal screw thread and forming a connecting fitting generally represented at 9.

The housing 3 is provided with an axial bore 5 open toward the wall 1a of the pipe 1 and provided at its upper end with an internal screw thread 7.

Figure 3:
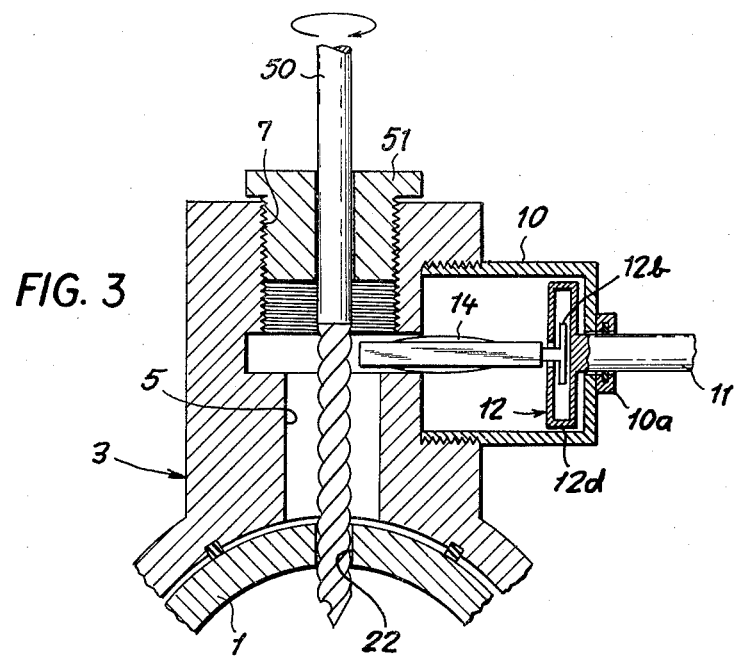
FIG. 3 is a view similar to FIG. 1 illustrating the drilling operation.

As can be seen from FIG. 3, the screw thread 7 is adapted to receive a guide bushing 51 of a drill whose bit 50 is guided thereby through the bore 5 to penetrate the wall of the pipe 1 and form an opening or orifice 22 therein.

The connecting fitting 9 removably receives an externally threaded sleeve 10 in which an actuating rod 11 is sealingly guided in its axial direction, i.e. along an axis A which is perpendicular to the axis B of the bore 5. The axis B, in turn, is radial with respect to the axis C to which it is perpendicular. Thus the axis A is perpendicular to the common plane of the axes B and C and is parallel to a plane D through the axis C perpendicular to the axis B. The seal for the rod 11 has been shown at 10a in FIG. 3.

The actuating rod 11 is connected by an articulation or flexible link 12 with a closure plate 14 which can be displaced toward the axis B and across the passage 5 into the sealing position shown, for example, in FIG. 1.

Figure 9:
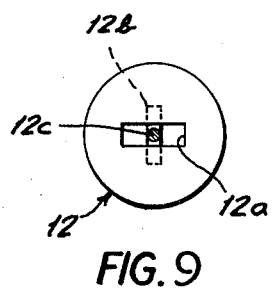
FIG. 9 is a detail view of the joint or articulation between the plate and its actuator.

The articulation 12 can comprise a rod 12c which is threaded into the plate 14 and which has a cross piece 12b received within a chamber 12d on the rod 11 and into which the cross piece 12b is inserted via a slot 12a (FIG. 9).

It will be immediately apparent that this connection allows axial displacement, i.e. displacement of the plate 14 along the axis B, relative to the rod 11.

The wall of the housing 3 within the connecting fitting 9 is formed with a slot 15 which constitutes a constriction relative to the cross section of this connecting fitting, the slot lying along the inner diameter D of this fitting (see FIG. 8).

This slot 15 has an upper face 17 which is formed flush, i.e. coplanar with the upper face 17a of a recess 16 provided in the wall of the housing 3 opposite the slot 15. The surfaces 17 and 17a that form a seat for the upper surface of the plate 14 which, as shown in FIG. 1 may be bowed to provide sealing and centering formations. The lower surface 18 of the slot 15 and the corresponding surface of the recess 16 form a seat for the valve member 19 of a valve unit.

As can be seen from FIG. 3, during the drilling of the pipe, the plate 14 is retracted through the slot to clear the drill and permit the latter to penetrate the wall of the pipe. However, once the drill has been withdrawn sufficiently to clear the plate 14, the latter is shoved across the passage 5 to assume the position shown in FIG. 1.

The drill guide bushing 51 and the drill 50 can then be removed and a valve unit 8 inserted.

The valve unit 8 includes the threaded plug 25 and a spindle 24 which is externally threaded (see FIG. 8) so that rotation of the spindle 24 can advance the valve member 19 into engagement with the seat 18.

Reference, in this regard, may be had to FIG. 8. This Figure shows the withdrawal of the temporary blocking member 14 and the housing or sleeve 10 together with the actuator 11. As can be seen from FIG. 8, upon such removal of the member 14, the valve member 19, which is composed of brass, can engage the seat 18. The seat 18 can be beveled to complementarily engage the beveled edge 19a of the plate 19. Of course, if desired, the plate 14 can be retained in the slot and used as an intermediate valve member which is clamped by member 19 against the seat 18. In this use, the plate 19 may partially obstruct the discharge slot 15 and be disadvantageous.

To ensure an effective seal and positioning of the plate 14 in its closed position in which the plugs at the opening surrounded by the set 17, the plate 14 may be provided with an annular formation or abutment which is best shown in FIGS. 4 through 7. The abutment 20 illustrated here is formed as a ring (FIG. 7) which is received in a recess in the upper surface of the plate 14 and is beveled or chamfered to engage the beveled surface 17' of the seat 17. The underside of the plate 14 can be beveled at 14a to engage the seat 18 in the lower position of the plate. The beveled formations then prevent withdrawal or insertion of the plate since they merely cam the plate centrally into the slot 15 when the latter is displaced in a direction parallel to the axis A. However, they serve to provide firm seals and to center the plate and thereby prevent lateral dislocation thereof by fluid pressure.

The cross section of the constriction 15 is so dimensioned that it corresponds substantially to the flow cross section of the bore 22.

The device is used as follows:

Initially the housing 3 is mounted on the pipe 1 and the nuts 2a are tightened on the U-bolts 2 to clamp the assembly at the desired location along the pipe, the seal 4 surrounding the region of the pipe to be penetrated.

The drill bushing 51 (FIG. 3) is applied and the drill 50 advanced and rotated in the usual manner to form the bore 22 in the wall of pipe 1.

The auxiliary blocking assembly 10, 11, 12, 14 is applied by passing the leading edge of the plate 14 into the slot 15 and threading the sleeve 10 into the fitting 9.

Upon withdrawal of the bit 50, the rod 11 is shifted to the left (from the FIG. 3 position to the FIG. 1 position) until the free end of the plate 14 enters the recess 16 on the opposite side of the housing from the fitting 9.

With removal of the boring tool, the pressure of the fluid from pipe 1 acts along the underside of the plate 14 to press the latter against the seat 17 and retain the plate against movement via the positioning formation 20.

The valve unit 8 is then mounted in the internal thread of the housing 3 and the spindle 24 can be actuated to press the valve member 19 against the upper surface of the plate 17 and lift the latter from its seat 17 against the fluid force in the opposite direction. The elevated pressure in pipe 5 displaces the plate out of the passage and permits the valve 19 to be closed onto the seat 18.

The sleeve 10 together with the plate 14 and the actuator 11 is then removed and a branch pipe 55 screwed into the fitting. The auxiliary blocking unit 10, 11, 12, 14 can then be used with another valve assembly.

I claim:

1. A valve assembly for connection to a pipe, comprising:
   a housing formed with a main passage opening toward said pipe and adapted to receive a drill for penetrating a wall of said pipe;
   a seal interposed between said housing and said wall around said main passage;
   means for clamping said housing onto said wall around said main passage;
   means for clamping said housing onto said pipe, said housing being formed with a lateral slot communicating with said main passage and with a recess open toward but opposite said slot;

an auxiliary blocking plate receivable in said slot and having a free end adapted to enter said recess upon displacement of said plate across said main passage, said housing being provided with an auxiliary passage communicating with said main passage through said slot and forming a connecting fitting;

a sleeve removably connected to said fitting;

an actuator displaceable in said sleeve toward and away from the axis of said main passage;

connecting means between said actuator and said plate for enabling displacement of said plate relative to said actuator along said axis and limited displacement transversely thereto; and a valve unit threaded onto said housing and having a spindle extending along said main passage and a valve member engageable with said plate and formed on said spindle, said recess and said slot having coplanar faces defining respective seats turned toward and away from said pipe, respectively, said plate being provided with a projecting formation on at least one side of said plate having inclined flanks receivable in and engageable with said seat turned toward said pipe for retaining said plate against lateral displacement by fluid pressure and self-centering said plate in said seat turned toward said pipe, when said spindle is withdrawn from contact with said plate, said plate being engageable by its opposite side with the seat turned away from said pipe, said plate being engaged by said spindle and being pressed thereby against said latter seat.

2. The valve assembly defined in claim 1 wherein said slot is disposed centrally of said fitting.

3. The valve assembly defined in claim 2 wherein the seats turned away from said pipe and said valve member have complementary sealing configurations.

4. The valve assembly defined in claim 3 wherein said seat turned away from said pipe and said plate have complementary sealing configurations.

5. The valve assembly defined in claim 4 wherein said configurations include beveled edges.

6. The valve assembly defined in claim 5 wherein the formation on said plate is annular.

7. The valve assembly defined in claim 6 wherein the cross section of said slot is substantially equal to the cross section of said passage.

8. The valve assembly defined in claim 7 wherein the means for clamping said housing to said pipe includes a pair of U-bolts straddling said pipe.

* * * * *